Dec. 4, 1962 H. W. JOHNSON 3,066,815
CAR TOP BOAT CARRIER AND THE LIKE
Filed Aug. 15, 1960 2 Sheets-Sheet 2
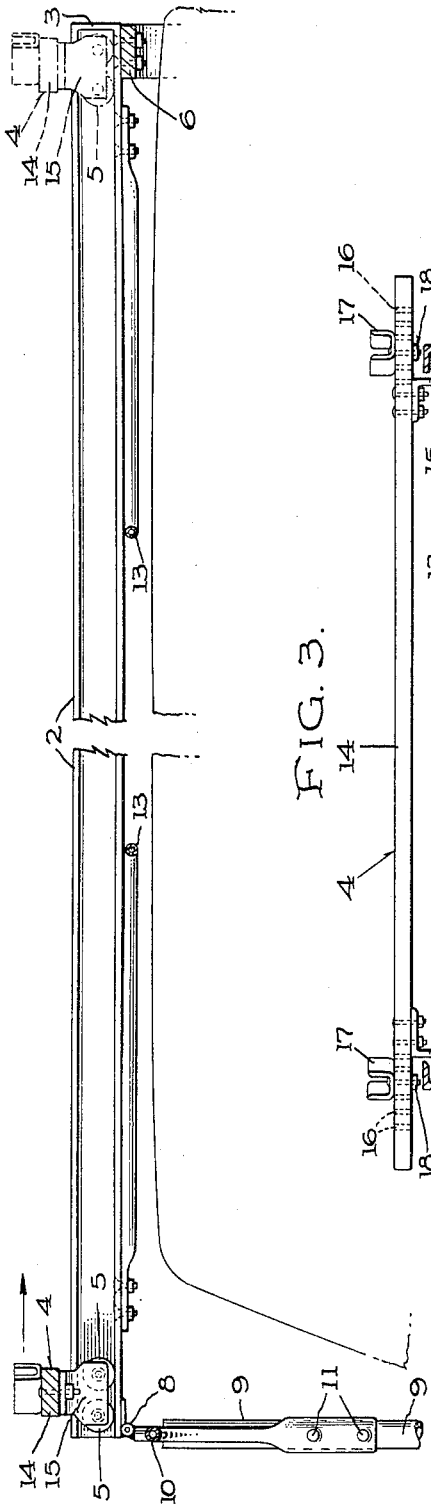
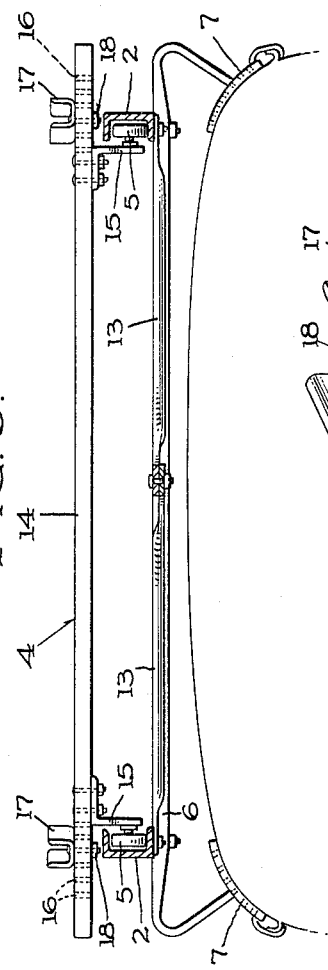
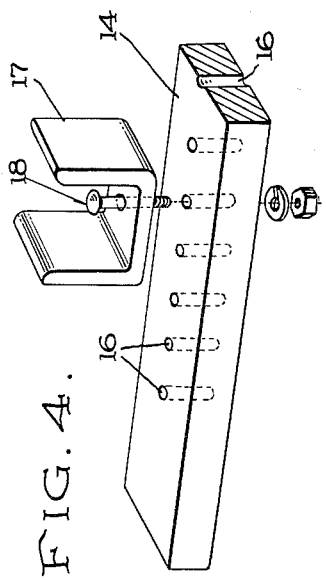
INVENTOR
HILTON W. JOHNSON
BY
ATTORNEYS United States Patent Office 3,066,815
Patented Dec. 4, 1962

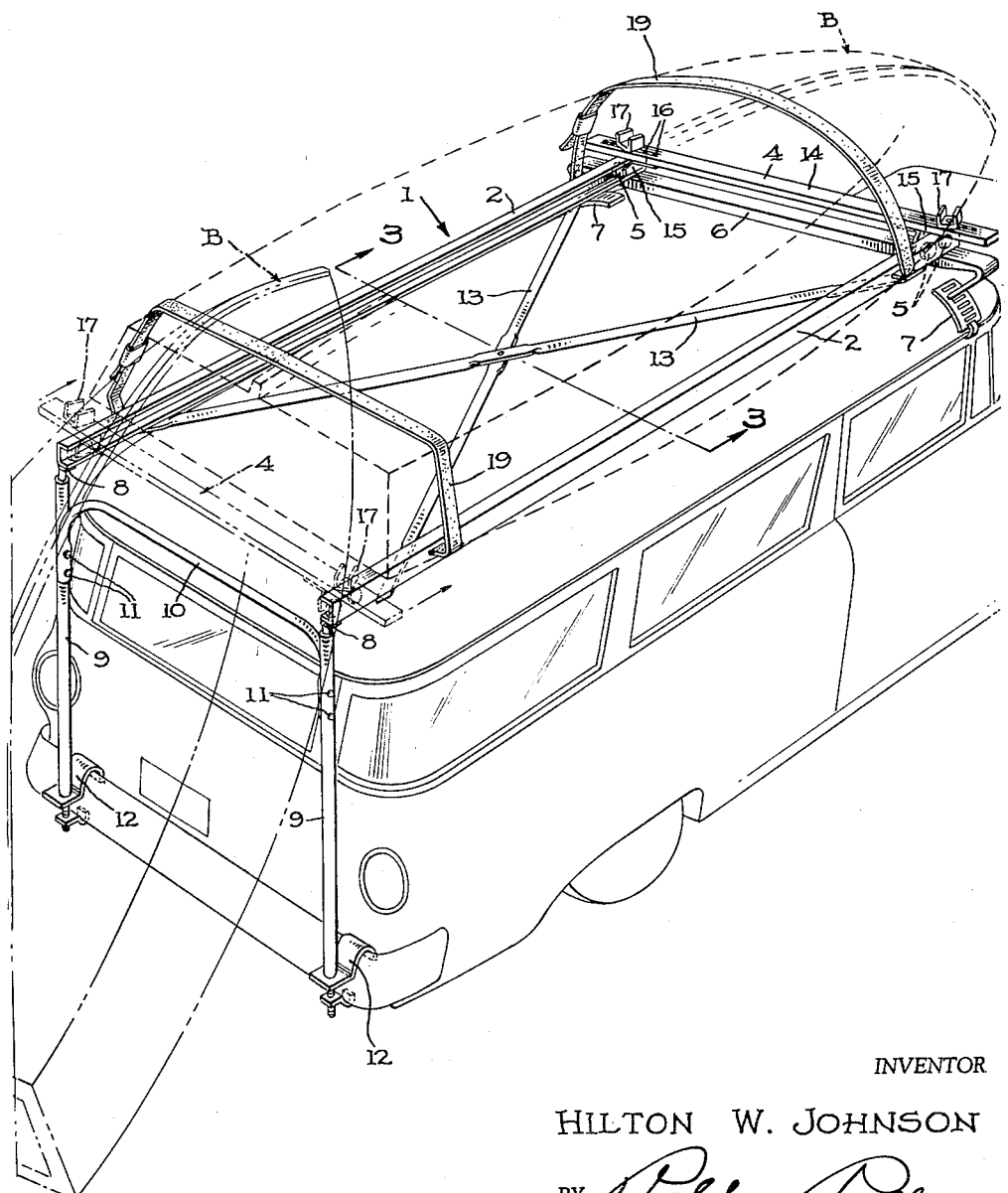

3,066,815
CAR TOP BOAT CARRIER AND THE LIKE
Hilton W. Johnson, 1292 Buckingham, SW.,
Grand Rapids 8, Mich.
Filed Aug. 15, 1960, Ser. No. 49,678
1 Claim. (Cl. 214—450)

The present invention relates to vehicle top-mounted article carries, and more particularly to an improved boat carrier of this type which is designed to facilitate easy and effective loading and transportation of a boat or other article thereon.

One object of the invention is to provide an improved automobile top-mounted boat carrier which is readily mountable, as well as readily demountable and foldable for easy storage thereof.

Another object is to provide an improved carrier of this type which enables one person to load and unload with ease elongated objects such as boats, canoes, ladders and the like without the necessity of having to climb upon the transporting vehicle.

Yet another object is to provide a carrier of this type which is simple in construction, sturdy, durable and relatively inexpensive, and which comprises a single movable load-supporting bar disposed transversely of and movable along a pair of opposed spaced tracks from an initial rearward loading position to a forward transporting position.

Still another object is to provide a carrier of the aforementioned type wherein the movable load-supporting bar is provided with load-positioning means to preclude horizontal shifting movements of the article relative thereto during initial loading thereof and during transit thereafter.

Other and further objects and advantages will become apparent to those skilled in the art from the following detailed description, taken in conjunction with the illustrative drawings, and the novel features thereof will be defined in the appended claim.

In the drawings:

FIG. 1 is a perspective view illustrative of my improved carrier and showing the movable transverse supporting bar in cooperative relation to a boat shown in broken outlines depicting the respective initial loading and fully loaded or transporting positions;

FIG. 2 is a longitudinal cross-section view of the carrier of FIG. 1 on an enlarged scale and better showing the details thereof;

FIG. 3 is a transverse cross-sectional view of my improved carrier as seen on line 3—3 of FIG. 1, and on the same enlarged scale as FIG. 2; and FIG. 4 is an enlarged fragmentary detail view of the adjustable load-positioning means shown in an exploded relationship to the movable support bar.

Like reference characters designate corresponding parts throughout the several figures of the drawings. My improved carrier assembly is designated generally at 1 and comprises a frame which includes a pair of laterally spaced, longitudinally extended channels or tracks 2, 2, having the open sides thereof facing each other, and preferably having closed forward ends 3, 3 respectively. Said channels or tracks 2, 2 serve to mount a movable load-supporting bar 4 which is disposed transversely of the tracks, and which is preferably provided with suitable anti-friction rollers 5, 5 adjacent each end thereof.

At the forward end of the assembly 1, the tracks 2, 2 are suitably attached to a fixed transversely disposed mounting support 6 which, in turn, is adapted to be anchored to the roof of a vehicle by means of a pair of clamping members 7, 7. At the rear of the assembly 1, the tracks 2, 2 are preferably pivotally connected as by hinges 8, 8 to a pair of upright supports or posts 9, 9 which are suitably interconnected near their upper ends by a transverse horizontal bracing support 10. The support 10 is preferably disposed slightly above the roof top level of the vehicle and slightly below the plane of the channels or tracks 2, 2 so that it can also serve to support the rearward end of boats or other articles that are to be transported on the carrier and which may not be wide enough to ordinarily be supported at the rear by the tracks themselves. When carrying boats which are to long and/or to wide to be suitably supported at their rear ends either by support 10 or by the rearward portions of the tracks 2, 2, then an auxiliary support (not shown) may be utilized by merely laying a suitable rigid bar or other elongated member transversely across the tracks at the desired place to bear the weight of the rear-end of the load.

Fastening bolts or rivets 11 are preferably used to attach the curved ends of support 10 to the uprights 9, 9 to give rigidity to that part of the carrier frame assembly, especially when in a demounted and folded condition. The lower ends of the uprights 9, 9 are preferably provided with adjustable bumper clamping brackets 12, 12 as shown in FIG. 1.

To give further rigidity to the assembly 1, a pair of cross-braces 13, 13 may be suitably secured to the tracks 2, 2 intermediate their forward and rearward ends, respectively.

Considering now the details of the movable transverse load-supporting bar 4, it comprises a preferably flat-sided rigid member or bar 14 which is of a length that slightly more than spans the laterally spaced tracks 2, 2. A pair of angular brackets 15, 15 is fixed to the underside of bar 14, with each bracket 15 preferably having a pair of anti-friction rollers 5, 5 disposed in tandem and freely rotatively carried thereby for cooperative rolling action within the tracks 2, 2. The use of tandem rollers 5, 5 at each end assures positive stability of the bar 14 so that its flat supporting top edge is always disposed in a horizontal position. Longitudinally of the bar 14 along the outermost ends thereof, there is provided a plurality of preferably uniformly spaced mounting holes 16 within which load-positioning means in the form of U-shaped brackets 17, 17 are adjustably mounted by means of bolt, washer and nut assemblies 18, 18, respectively (see FIG. 4). Each bracket 17 may be mounted in any position along the bar 14 as permitted by the selective mounting holes 16 to accommodate the boat or other article to be transported on the carrier, and each bracket may be angularly adjusted on a vertical axis as desired or required to receive the curved gunwales of a boat or a longitudinally curved edge or other appropriate part of any other article capable of being transported on the carrier. The purpose of the brackets 17, 17 is to provide means for positioning the forward and usually curved part of the gunwales of a boat therein so as to preclude undesirable lateral and longitudinal sliding or shifting movements of the boat during the loading operation which will be described shortly hereinafter, as well as during transportation of the load. Similarly, the brackets 17, 17 can be arranged so as to accommodate and support articles such as ladders and the like, in a manner as to preclude similar shifting movements while loading and while in transit.

To load my improved carrier after it has been attached to the vehicle, the movable load-supporting bar 4 is moved to a rearward position along the tracks 2, 2 as shown in dash-dot outline in FIG. 1, with the gunwale brackets 17, 17 preferably having been adjusted beforehand to accommodate the boat or other article to be transported. The bow of the inverted boat B is then raised to a generally upright position where the gunwales thereof may be aligned with or partially seated within the pre-set brackets 17, 17 on the support bar 4. Following this, the person loading the boat B should gently raise the stern thereof and simultaneously gently walk forward while progressively elevating the stern until the boat assumes a substantially horizontal fully loaded position on the carrier frame and generally centered over the top or roof of the vehicle. The weight of the boat is concentrated mostly upon the roller-mounted support bar 4 during the loading operation just described, thereby making it easy for one person to move the load upward and forward to a fully mounted position where said rollers come to rest against the closed ends 3, 3 of the tracks 2, 2, respectively.

Most small boats which would be normally carried in this manner are generally of a length and width such that the stern end will rest easily upon either the rear portions of the tracks 2, 2 or upon the transverse cross-support 10. As previously mentioned, for boats having an extra wide beam and being of a length too long to rest upon the rearward portions of the tracks, an auxiliary bar or other support (not shown) may be placed across the rear ends of the tracks to support the load at that portion.

After the boat is in its raised and fully loaded position upon the carrier 1, suitable means such as releasable straps 19, 19 secured to the tracks 2, 2 in a conventional manner may be utilized to secure the boat onto the carrier during transportation thereof. Alternatively or additionally, ropes and/or other stays or ties may be utilized to secure the boat on the carrier, as by securing the bow and stern ends, respectively, to the front and rear bumpers of the vehicle, or to any other conveniently accessible portions thereof that are strong enough to sustain the strains imposed thereon during transportation.

While one specific form of my invention has been described and illustrated in detail, other changes and alterations may be made without departing from the spirit thereof as defined in the annexed claim.

I claim:

A vehicle top-mounted boat carrier of the class described, comprising a frame including a pair of straight track bars disposed in opposed spaced relation and having means for mounting the same substantially horizontally on the top of a vehicle, a movable load-supporting bar disposed transversely of the track bars and having guide roller means at each end thereof engageable with the respective track bars to permit free movement of the load-supporting bar along the track bars from an initial loading position at the rearward ends of said track bars to a transporting position at the forward ends of said track bars, and load-positioning means on said load-supporting bar adjacent to each end thereof and extended upwardly thereabove for precluding horizontal shifting movements of the boat relative thereto during initial loading and transit thereafter, said track bars having separate means for anchoring the forward and rear ends respectively of the track bars to the vehicle, said anchoring means at the rear ends of the track bars including a pair of vertically disposed uprights hingedly connected to the respective track bars at the upper ends of the uprights to permit folding of said frame when in a demounted condition, the lower ends of said uprights having bumper clamping means rigidly carried thereby to rigidly anchor the same to a bumper of the vehicle with the uprights extended vertically upwardly from said bumper and so remaining at all times during loading and unloading of the boat, and each load-positioning means on said load-supporting bar including a U-shaped bracket laterally adjustable along said load-supporting bar and additionally adjustable about an axis perpendicular to said load-supporting bar.

References Cited in the file of this patent
UNITED STATES PATENTS

| | | |
|---|---|---|
| 2,561,199 | Harder | July 17, 1951 |
| 2,573,187 | Desilets | Oct. 30, 1951 |
| 2,746,628 | Neyra | May 22, 1956 |
| 2,931,528 | Mabry | Apr. 5, 1960 |